Dec. 10, 1963 E. R. ANDREGG 3,114,036

DATA RECORD

Filed July 21, 1961

INVENTOR
E. R. ANDREGG
BY
Harry L. Newman
ATTORNEY

1

3,114,036
DATA RECORD
Ernest R. Andregg, Indianapolis, Ind., assignor to Bell Telephone Laboratories, Incorporated, New York, N.Y., a corporation of New York Filed July 21, 1961, Ser. No. 125,750
2 Claims. (Cl. 235—61.12)

This invention relates to data records and particularly to data records of the kind comprising discrete groupings of representation elements, such as holes, in a planar structure.

Although not limited thereto, the present invention is particularly suited for use with automatic telephone call transmitters of the type disclosed in the copending application of Ernest R. Andregg—William Pferd—Rembert R. Stokes, Serial No. 844,054, filed October 2, 1959, of which this is a continuation-in-part.

In automatic call transmitters of this type, frequently called numbers are stored on individual data records. Each data record includes a plurality of representation areas, and each digit of the telephone number stored on a record is sequentially represented by the particular disposition of one or more representation elements within the respective representation areas. The call transmitter includes sensing means for sequentially scanning the representation areas of a record and detecting the disposition of the representation elements within each of the areas, and means under the control of the sensing means generates signals corresponding to the digits represented within each of the representation areas.

Heretofore, these data records have consisted of planar structures having a plurality of representation areas each of which has ten digit representation locations. A digit has been represented by a single representation element positioned in one of the ten representation locations, the particular location of the single element among the ten possible locations being equal to the value of the digit, that is, the digit 1 is represented by the element being in the first location, the digit 3 is represented by the element being in the third location, and the digit 0 is represented by the element being in the tenth location.

This data record, however, has several disadvantages. First, it is large since it includes ten digit representation locations for each digit. Secondly, it adds to the complexity of the means for sensing the representation element on the record since the sensing means must include a sensing element for each digit representation location. Finally, this data record is not readily utilized with automatic call transmitters that generate alternating current multifrequency signals wherein each digit is transmitted to the central office by means of a unique pair of voice frequency tones.

An object of this invention is to provide an improved data record of the type comprising discrete groupings of representation elements in a planar structure.

Specifically, an object of this invention is to provide a data record of this type that is reduced in size, and permits the sensing means of the device with which it is used to be reduced in complexity.

Another object of this invention is to provide a data record that is readily utilized with an automatic call transmitter adaptable to transmit both direct current and alternating current signals.

These and other objects of the present invention are achieved in an illustrative embodiment thereof wherein the data record comprises a card having a plurality of digit representations spaced along the longitudinal axis thereof, each digit representation being placed within an individual, strip-like representation area extending in a direction transverse to the longitudinal axis of the card. Each of the representation areas includes a small central

2 portion having a single representation location and larger portions on both sides thereof each having three representation locations. Each digit representation is one of a series of different combinations of discrete, spaced, representation elements, and each combination consists of at least a single representation element in one of the area portions and at most a single representation element in each of two of the area portions. Each representation element consists of a hole in the card in one of the representation locations.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

Figure 1:
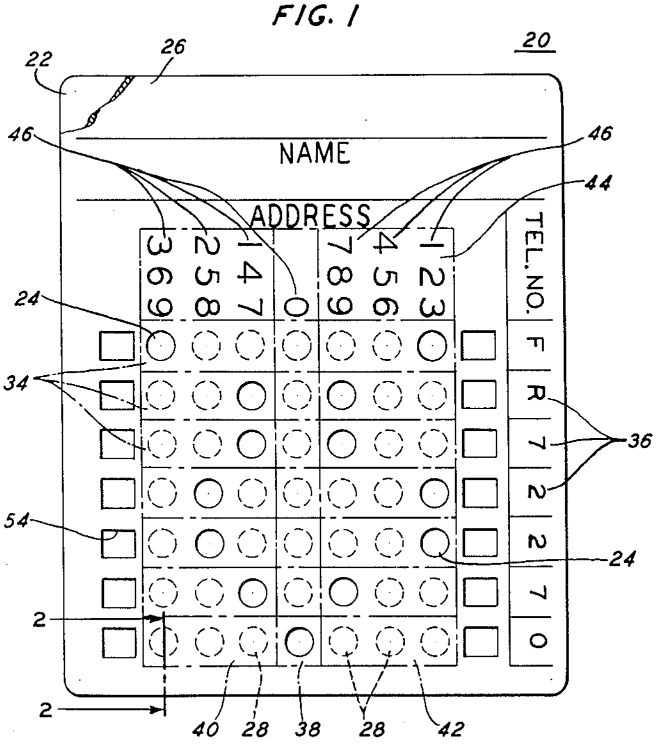
FIG. 1 is a plan view of an embodiment of the record card of this invention.
Figure 2:
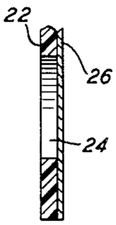
FIG. 2 is an enlarged fragmentary sectional view of FIG. 1 taken along line 2—2 showing the construction of knockouts in the record card.

Referring to the figures and particularly to FIGS. 1 and 2, one embodiment of the invention comprises a record web in the form of a card 20, the card including a rectangular member 22, typically plastic, having an array of holes 24 arranged in a plurality of rows. The member 22 is overlaid by a thin sheet of material 26, typically paper, that provides a cover for each of the holes and provides a surface upon which information can be readily recorded. The material 26 is easily punctured by a pencil or similar instrument at the points it extends over the holes in the member 22 and thus the combination of the member 22 and the material 26 provides the card 20 with an array of removable portions 28, hereinafter referred to as knockouts.

Figures 3, 4:
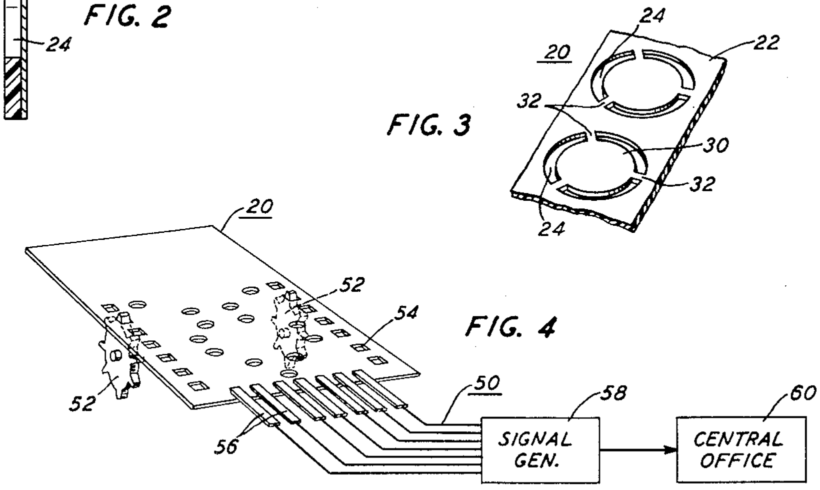
FIG. 3 is an enlarged plan view of an alternative knockout construction.
FIG. 4 is a schematic view of the record card of the invention being utilized by an automatic telephone call transmitter.

As illustrated in FIG. 3, another way of providing the knockouts is by eliminating the sheet 26 and providing the member 22 with individual disks 30 within each of the holes 24, the disks being integrally joined to the member 22 by gates 32. By pressing against a disk 30 with a pencil or similar instrument, the gates 32 supporting the disks are sheared and the disk removed.

Both of the above constructions of the record card 20 are designed to enable the subscriber, himself, to prepare the card to represent a particular telephone number. Each digit of the telephone number is represented within an area defined by a single row of knockouts, this area being indicated by a reference character 34 and hereinafter referred to as a digit representation area. To assist the subscriber in preparing the card, individual spaces 36 are advantageously provided along one side thereof in line with each of the representation areas 34. The subscriber sequentially records the individual letters and digits of the telephone number in the spaces 36, and he is thereby made aware of the letter or digit to be represented by each of the representation areas.

The number of representation areas 34 must be no less than the number of letters and digits included in the telephone number to be represented by the card. As shown in FIG. 1, if the desired telephone number has two letters and five digits, the card has no less than seven representation areas. A card could, however, be provided with as many as fourteen representation areas to encompass all telephone numbers now in use and those anticipated for future use.

Each representation area 34 is divided into three portions. There is a single small area portion 38 and two larger area portions 40 and 42. Digits are represented by having different combinations of discrete, spaced, representation elements, which in this case are holes, in the various area portions of each representation area. The holes are, of course, formed by removing the knockouts 28, and thus each knockout is a potential location for a representation element and may therefore be properly referred to as a representation location. The small area portion 38 of each representation area 34 has a single representation location, while each of the larger area portions 40 and 42 has three representation locations.

To enable the subscriber to properly prepare the card to represent a particular telephone number, representation information 44 in the form of digit groupings 46 is provided above the representation areas 34 for each of the area portions 38, 40, and 42, there being a digit grouping associated with each of the representation locations included in each area portion. The digit groupings 46 included in the representation information for each of the larger area portions 40 and 42 consist of unique groupings of the digits 1 through 9. There are three of these digits in each grouping and each digit appears only once. Furthermore, the digit groupings are different for each of the larger area portions. The digit grouping included in the representation information for the small area portion consists of just the digit 0. Though not shown, the digit 0 may also appear as a fourth digit in one of the digit groupings of one of the larger area portions.

To prepare a card to represent a telephone number, the subscriber records the letters and/or digits of the telephone number in the spaces 36 provided at the side of each of the representation areas 34. Taking one digit at a time, the subscriber looks to see what digit is recorded adjacent to a particular representation area and observes in which digit grouping 46 this digit appears. He then removes the knockouts 28 in that representation area from the representation locations situated beneath these digit groupings. If the digit is 1 to 9 inclusive, the subscriber removes a knockout from a single representation location in each of the larger area portions 40 and 42. If the digit is a 0, he removes the knockout from the single representation location in the small area portion 38 and possibly a single knockout from one of the representation locations in one of the larger area portions 40 or 42. If a letter rather than a digit appears adjacent to a representation area, the letter is converted into a digit by reference to the number plate of a conventional telephone dial.

To be specific, taking the telephone number illustrated in FIG. 1, FR7–2270, the first representation area 34 represents the letter F which is converted into the digit 3 by reference to a telephone dial. The digit 3 appears in the digit grouping 46 associated with the first representation location in the larger area portion 40 and in the digit grouping associated with the third representation location in the larger area portion 42, and so a knockout 28 is removed in each area portion from these representation locations. In the second representation area 34, the letter R is converted into the digit 7. This digit appears in the digit grouping associated with the third representation location in the larger area portion 40 and in the digit grouping associated with the first representation location in the larger area portion 42, and thus a knockout 28 is removed in each area portion from these representation locations. The third representation area 34 represents the digit 7 which is the same as the letter R and so the same knockouts 28 are removed as in the second representation area. The fourth and fifth representation areas 34 both represent the digit 2. The digit 2 appears in the digit grouping associated with the second representation location in the larger area portion 40 and in the digit grouping associated with the third representation location in the larger area portion 42. A knockout 28 is therefore removed in each area portion from these representation locations. The sixth representation area 34 represents the same digit as the third representation area and therefore the knockouts 28 are removed from the same representation locations. Finally, the seventh representation area 34 represents the digit 0. The digit 0 only appears in the digit grouping associated with the single representation location in the small area portion 38 and consequently only the knockout 28 in this representation location is removed.

From what has been stated, it should be clear that each row of knockouts 28 defines a digit representation area 34 within which each knockout serves as a digit representation location. Each representation area is divided into a small area portion 38 having a single representation location and two larger area portions 40 and 42 each having three representation locations. Each digit is represented by different combinations of discrete, spaced, representation elements, each element consisting of a hole in the card in one of the representation locations, and each combination consists of at least a single representation element in one area portion and at most a single representation element in each of two of the area portions.

Although not shown, additional knockouts may be provided alongside of and in line with each digit representation area 34 for indicating information other than digit representation.

The card 20 is utilized with an automatic telephone call transmitter 50 of the type schematically illustrated in FIG. 4. Such a call transmitter is described in detail in the aforementioned Andregg et al. application, and since specific features of the call transmitter form no part of the present invention, a detailed description thereof is not believed necessary.

Suffice it to say that the call transmitter 50 includes toothed wheels 52 which engage feed holes 54 in the card 20. The feed holes are asymmetrically located with respect to the card and thus polarize the card so that it can be inserted into the call transmitter in the correct position only, thereby insuring proper reading of the information stored on the card. The toothed wheels 52 move the card relative to a row of seven sensing springs 56, there being a sensing spring for each representation location on the card. The sensing springs are biased against the card, and when the holes in the card move beneath the springs, the springs move into the holes, resulting in the closing and/or transfer of contacts on the springs. The sensing springs 56, along with other components not shown, control the operation of a signal generator 58 that transmits signals, which may either be direct current pulses or alternating current tone bursts, corresponding to the digit represented by the holes in the card to a central switching office 60 of the telephone system.

Although but one embodiment of the invention has been illustrated and described in detail, it is to be expressly understood that the invention is not limited thereto. Various changes can be made therein without departing from the spirit and scope of the accompanying claims.

What is claimed is:

1. A telephone data record for controlling the operation of an automatic call transmitter, the data record comprising a rectangular card having the digits of a telephone number represented thereon, each individual digit representation being spaced along the longitudinal axis of the card and each placed within a strip-like representation area extending in a direction transverse to the longitudinal axis of the card, each of the digit representation areas including a small central portion having a single representation location and a larger portion on each side thereof having three representation locations, each digit representation comprising a hole in a single representation location in each of the larger area portions for the digits 1 through 9 and a hole in the single representation location in the central area portion for the digit 0, first and second feed holes situated on opposite sides of and in line with each representation area, each first feed hole being a first particular distance from the side of the card adjacent thereto and each second feed hole being a second particular distance from the side of the card adjacent thereto, the first and second particular distances being unequal.

2. A telephone data record for controlling the operation of an automatic call transmitter, the data record comprising a rectangular card having an area extending transverse to the longitudinal axis of the card and situated at one end of the card for accommodating the name of an individual telephone subscriber, two aligned columns of feed holes extending parallel to the longitudinal sides of the card and asymmetrically located with respect thereto, a plurality of digit representations situated between the columns of feed holes, the digits represented being the telephone number of the subscriber whose name appears in the name area, each digit representation being spaced along the longitudinal axis of the card and placed within a strip-like representation area that extends transverse to the longitudinal axis of the card, each representation area being bounded by and in line with a pair of feed holes, each representation area including a small central portion having a single representation location and larger portions on both sides thereof each having three representation locations, each digit representation comprising a hole in a single representation location in each of the larger area portions for the digits 1 through 9 and at least a hole in the single representation location in the central area portion and at most a hole in both the single representation location in the central area portion and a single representation location in one of the larger area portions for the digit 0.

References Cited in the file of this patent

UNITED STATES PATENTS 2,308,927 Maul ---------------- Jan. 19, 1943